J. R. SNYDER.
HARROW.
APPLICATION FILED SEPT. 18, 1913.

1,108,013.

Patented Aug. 18, 1914.

Witnesses
C. V. P. Newbold
Chas. P. Nunn

Inventor
J. R. Snyder
By A. Randolph Jr.
Attorney

UNITED STATES PATENT OFFICE.

JOHN R. SNYDER, OF DALLAS CENTER, IOWA.

HARROW.

1,108,013.

Specification of Letters Patent.   Patented Aug. 18, 1914.

Application filed September 18, 1913.   Serial No. 790,508.

*To all whom it may concern:*

Be it known that I, JOHN R. SNYDER, a citizen of the United States, residing at Dallas Center, in the county of Dallas and State of Iowa, have invented certain new and useful Improvements in Harrows; and I do hereby declare the following to be a full, clear, and exact description of the invention, such as will enable others skilled in the art to which it appertains to make and use the same.

My invention relates to new and useful improvements in harrows and has for its object the provision of means for preventing trash and other foreign matter, or lumps of sod, from interfering with the operation of the harrow, as well as to assist the teeth of the harrow in their operation of pulverizing the soil.

A further object of my invention is to provide a harrow such as described which employs a pair of conical rollers that are loosely mounted adjacent each end of the harrow, and adapted to assist the teeth of the harrow in their operation.

A still further object of my invention is to provide a harrow of the character described, which is simple as to construction and arrangement of parts, reliable and efficient in its operation and cheap to manufacture.

The above and additional objects are accomplished by such means as are illustrated in the accompanying drawings described in the following specification and then more particularly pointed out in the claims which are appended thereto and form part of this application.

Figure 1:
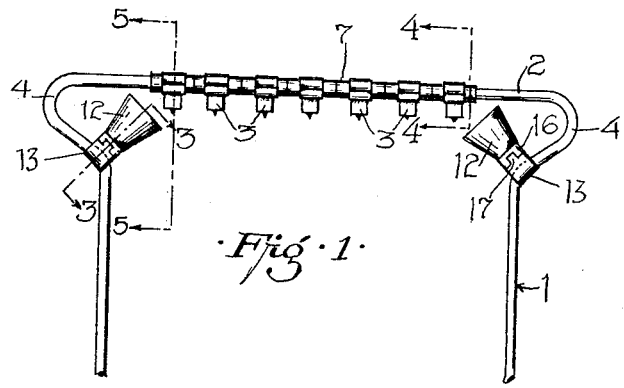
Figure 2:
Figure 4:
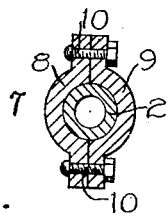
Figure 5:
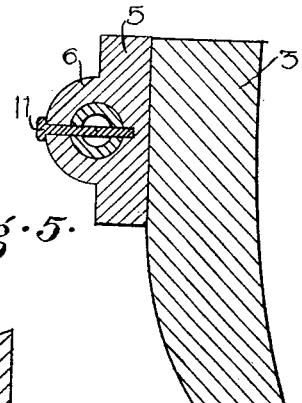
Figure 3:
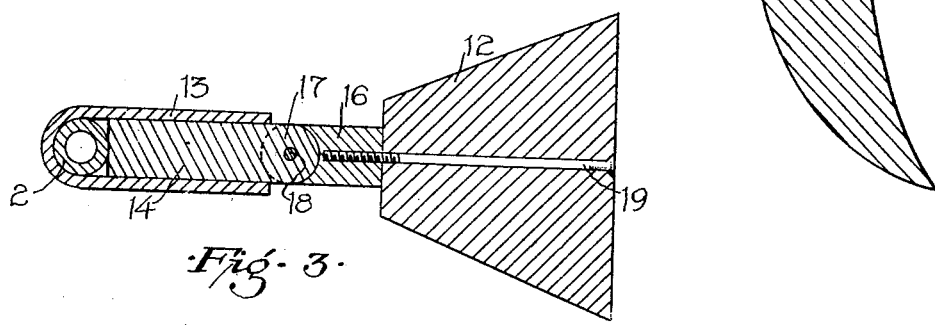

With reference to the drawings, wherein I have illustrated the preferred embodiment of my invention as it is reduced to practice, and throughout the several views of which, similar reference numerals designate corresponding parts: Figure 1 is a top plan view illustrating the harrow of my improved construction in assembled position; Fig. 2 is a side elevation, Fig. 3 is a cross sectional view taken on line 3—3 of Fig. 1 illustrating the conical roller and the fastening means therefor, Fig. 4 is a sectional view taken on line 4—4 of Fig. 1, and Fig. 5 is a vertical sectional view taken on line 5—5 of Fig. 1, illustrating in detail one of the teeth of the harrow and the means of securing the teeth to the harrow frame.

Referring to the drawings the numeral 1 designates as an entirety the frame work of the harrow. This frame 1 is of an approximately U shape and constructed of any suitable material. The bight portion 2 of the frame 1 is adapted to support the harrow teeth designated 3 as an entirety, and is provided at each terminal with the curved portions 4, the purpose of which will be hereinafter more fully described. Each of the harrow teeth 3 is provided with a supporting plate 5, which has formed thereon an apertured ear 6, through which the bight portion 2 of the frame 1 is to be inserted. The teeth 3 are arranged in spaced relation to each other upon the bight portion 2 of the frame 1 and are held in that position by means of the split collars designated 7 as an entirety. These split collars 7, each consist of a pair of co-acting semi-circular flange clamping plates 8 and 9, that are secured about the bight portion 2 by means of the bolts 10, or other suitable fastening means. These collars 7 are arranged between the teeth 3 upon the bight portion 2 and secured thereon after the manner described. A break pin 11 is inserted through each of the apertured ears 6 on the bearing plate 5 of the harrow teeth 3, and through the bight portion 2 of the frame 1. It will thus be seen that when the teeth are moved into engagement with a stump, rock, or other obstacle in the path of the harrow, the break pin 11 will snap and thus prevent the teeth from becoming broken.

The means for preventing the accumulation of trash, or lumps of sod adjacent each end of the bight portion 2, consist of a pair of conical rollers designated 12, which are loosely mounted upon the curved portions 4, of the frame 1, adjacent each terminal of the bight portion 2. The U shaped clamping plate 13, is fitted about each curved portion 4, and is adapted to receive a hinge plate 14, that is mounted within the U shaped clamping plate 13 and held against removal therefrom by suitable fastening means not shown. The rollers 12 are each provided at their smaller terminals with a tongue portion 16, that is pivotally secured to the hinge plate 14, between a pair of spaced ears 17, formed on the hinge plate, by means of a hinge pin 18, as will be clearly seen with reference to Fig. 3 in the drawing. A screw 19 is inserted longitudinally through each of the rollers 12 and has threaded engagement with the tongue 16 and serves to hold the tongue in operative position upon the rollers 12.

In operation the harrow is drawn over the field to be operated upon, and the conical rollers 12 carried at each terminal of the bight portion 2 of the harrow frame roll over any accumulation of trash, or lumps of sod that may have collected at that point and obviously increase the efficiency of the harrow. Any lumps of dirt or sod will be pulverized by the action of the rollers 12, which in being pivotally mounted after the manner described are capable of free movement upon the frame.

It is apparent with reference to the foregoing description and accompanying drawing that a harrow has been provided which will accomplish all the functions hereinbefore recited, and the arrangement of the conical rollers, such as described, increases the pulverizing action of the harrow.

In reduction to practice, I have found that the form of my invention, illustrated in the drawings and referred to in the above description, as the preferred embodiment is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus described my invention I claim:

1. A harrow comprising a frame, a plurality of teeth carried upon said frame, and a pair of conical rollers pivotally carried by said frame adjacent to said teeth.

2. A harrow comprising a frame, a plurality of teeth mounted upon said frame, said frame curved adjacent its forward terminal, a U shaped clamping plate mounted upon each of the curved portions of said frame, a hinge plate secured to said U shaped clamping plate and a pair of conical rollers pivotally secured to said hinge plate.

3. A harrow comprising a frame, said frame of a U shape and provided at its bight portion with curved portions, a plurality of teeth mounted upon the bight portion of said U shaped frame, a clamping plate loosely mounted upon the curved portion of said frame, a hinge plate mounted within each of said clamping plates, a pair of conical rollers, a tongue carried upon the smaller terminals of each of said rollers, means for removably securing said tongue to said rollers, and said tongue pivotally secured to said hinge plate.

4. A harrow comprising a U-shaped frame, a plurality of teeth mounted upon the central portion of said frame and conical rollers pivotally carried by said frame adjacent the ends of the central portion thereof.

In testimony whereof I affix my signature in presence of two witnesses.

JOHN R. SNYDER.

Witnesses:
 S. E. EMMERT,
 BERT EMMERT.

---

Copies of this patent may be obtained for five cents each, by addressing the "Commissioner of Patents, Washington, D. C."